INVENTOR
Gaylord W. Penney
BY O.B.Buchanan
ATTORNEY

Dec. 4, 1962    G. W. PENNEY    3,066,463
TWO-STAGE PRECIPITATOR
Filed April 28, 1958    2 Sheets-Sheet 2

United States Patent Office 3,066,463
Patented Dec. 4, 1962

3,066,463
TWO-STAGE PRECIPITATOR
Gaylord W. Penney, 216 Paris Road, Pittsburgh 35, Pa.
Filed Apr. 28, 1958, Ser. No. 731,195
14 Claims. (Cl. 55—139)

My invention relates to electrical precipitators for atmospheric dust, and particularly to two stage precipitators comprising an ionizing stage for ionizing the particles which are to be precipitated, a collector-stage for precipitating the ionized particles, and a means for causing the gas to pass first through the ionizing stage and then through the collector-stage, as is broadly covered in my Patent No. 2,129,783, granted September 13, 1938.

The present invention relates more particularly to the ionizing stage of such a two-stage gas-cleaning unit, specifically an unbreakable-wire ionizer for a room-cleaning unit, including a pulsating unidirectional-voltage power-source therefor, and including various novel structural assemblies, circuits, and parts, which, while specifically designed for a unit of the class just described, may also include features which are of more generic application in other two-stage precipitators.

The essential principles of my invention will better be understood from the following description of several exemplary forms of embodiment which are shown in the accompanying drawings, wherein.

Figures 1, 2, 3:
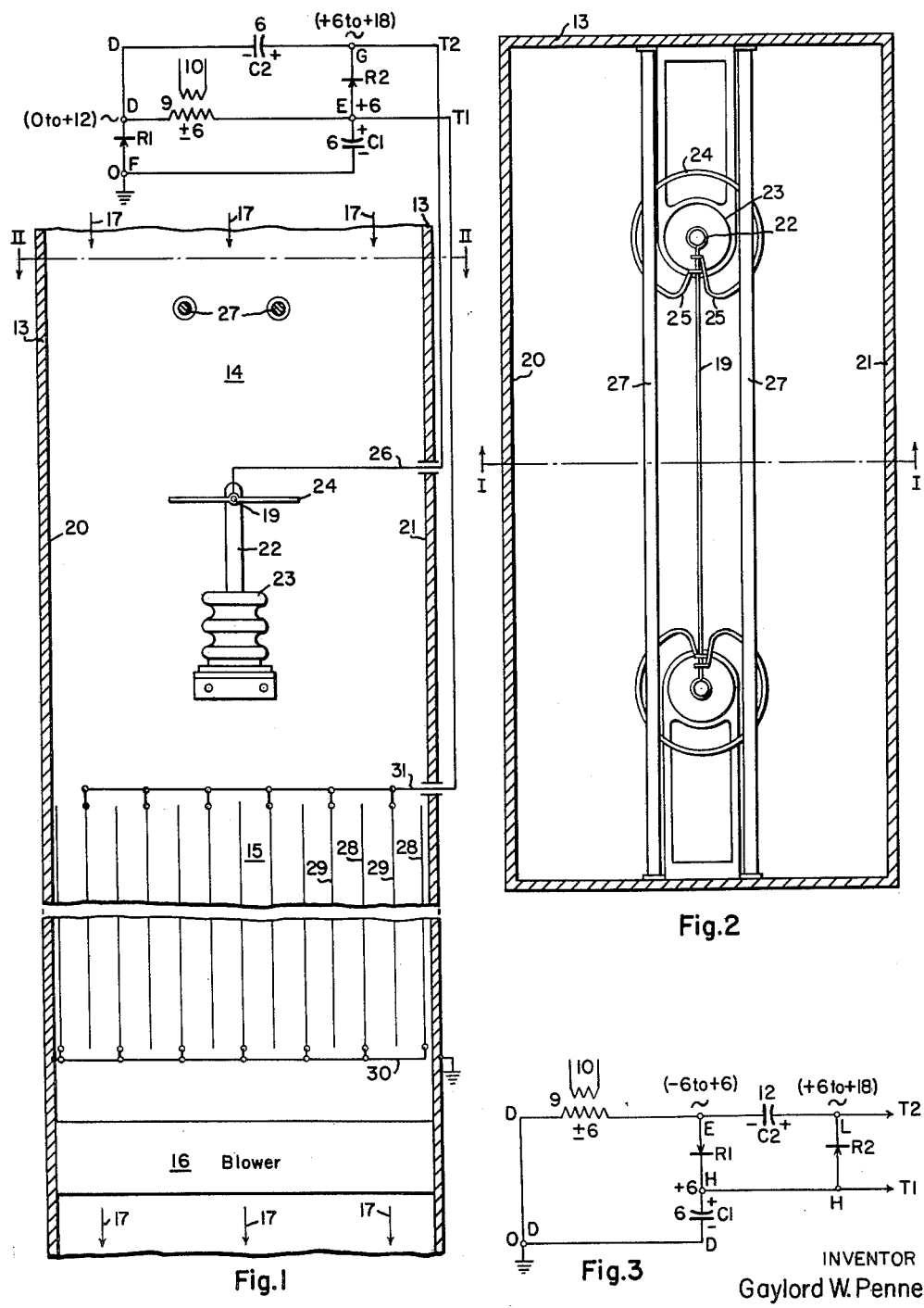
FIGURE 1 is a diagrammatic view, not to scale, indicating a power-pack, and a section end-elevational view of a complete air-cleaning unit in a preferred exemplary form of construction, the section-plane being indicated at I—I in FIG. 2.
FIG. 2 is a sectional top-plan view of the same unit, on a section-plane such as is indicated at II—II in FIG. 1.
FIG. 3 is a diagrammatic view of a modified form of power-pack which could be substituted for the one which is shown in FIG. 1.
Figure 4:
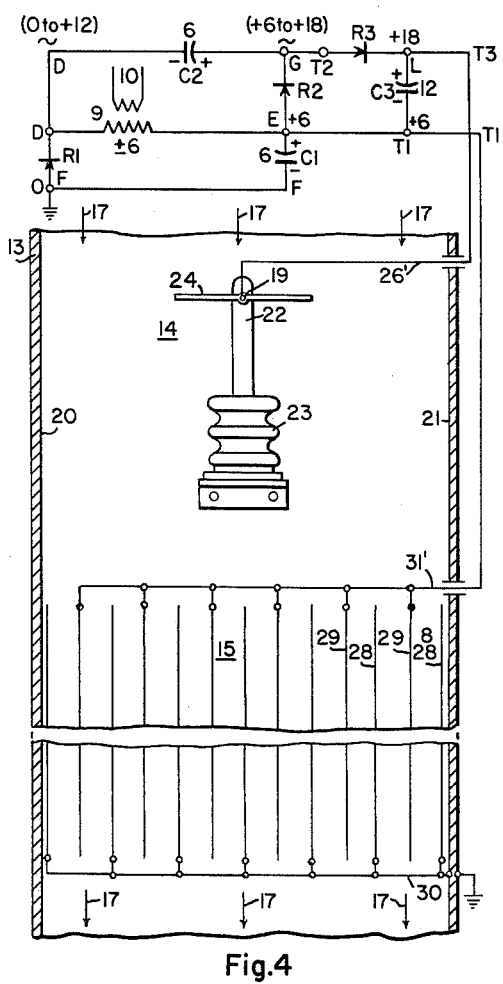
Figure 6:
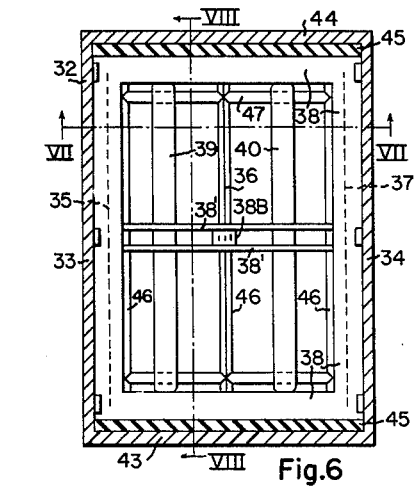
Figure 7:
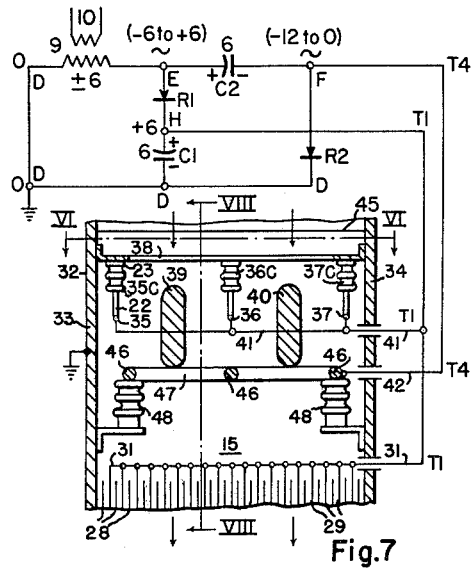
Figure 5:
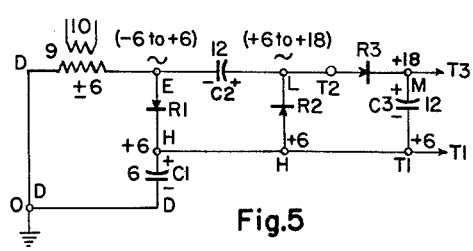
Figure 8:
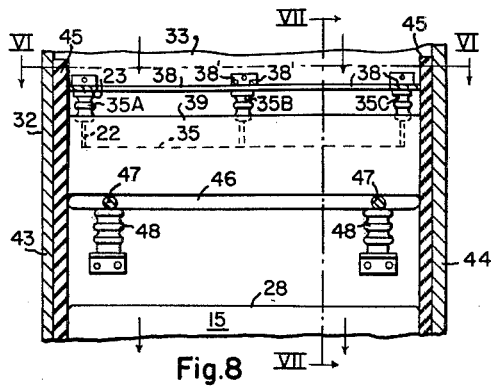

FIG. 4 is a view, similar to FIG. 1, showing modifications in both the power-pack and the air-cleaning unit, wherein the structural unit is simplified by omitting the gas-pervious non-ionizing electrode-means which was needed, in FIG. 1, to give the dust-charging depth which was necessitated by a pulsating unidirectional voltage on the ionizing wire, at the expense of a somewhat larger power-pack which now delivers a substantially constant unidirectional voltage to the ionizing wire in FIG. 4;

FIG. 5 is a diagrammatic view of a modified form of power-pack which could be substituted for the one which is shown in FIG. 4;

FIG. 6 is a sectional top-plan view of a three-electrode ionizing stage in which my invention can be embodied, the section-plane being indicated at VI—VI in FIGS. 7 and 8;

FIG. 7 is a diagrammatic view, not to scale, showing a power-pack, and a sectional end-elevational view of a complete air-cleaning unit using the three-electrode ionizing stage of FIG. 6, the sectiono-plane being indicated at VII—VII in FIGS. 6 and 8, and FIG. 8 is a sectional side-elevational view of a complete air-cleaning unit using the three-electrode ionizing stage of FIGS. 6 and 7, the section-plane being indicated at VIII—VIII in FIGS. 6 and 7.

The top of FIG. 1 shows an electrical single-phase supply-means, operable directly from an alternating-current industrial power-line of an ordinary frequency, and commonly called a power-pack, comprising a transformer 9, two capacitors C1 and C2, and two rectifiers R1 and R2, which may be similar to the component-parts of the voltage-doubling power-packs which have heretofore been used in two-stage gas-cleaning units. The wiring, however, is different, and the output is different, in that the power-pack of FIG. 1 has a first output-terminal T1 having a substantially constant positive unidirectional potential having the peak value of the transformer-secondary DE, and a second output-terminal T2 having pulsating positive unidirectional potential which varies between a minimum value equal to the peak transformer-voltage and a maximum value equal to three times the peak transformer-voltage, during alternate half-cycles of the transformer supply-circuit 10.

The top of FIG. 1, and the alternative connections of FIG. 3, show two ways in which this pulsating unidirectional output-voltage can be obtained in the output-circuit T2 of the power-pack. In both cases, there is a first rectifier-circuit, EFDE in FIG. 1, or DHED in FIG. 3, including the first capacitor C1, the first rectifier R1, and the transformer-secondary DE; there is a second rectifier-circuit, EDGE in FIG. 1, or DHLED in FIG. 3, including the second capacitor C2, the second rectifier R2, and the transformer-secondary DE; and there is an output-circuit, FEDG(T2) in FIG. 1, or DEL(T2) in FIG. 3, including the transformer-secondary DE and the second capacitor C2. The first capacitor C1 is also included, either in the output-circuit, FEDG(T2), as in FIG. 1, (as shown at FE) or in the second rectifier-circuit, DHLED, as in FIG. 3, (as shown at DH). In the power-packs of both FIG. 1 and FIG. 3, the rectifier-circuits charge their capacitors to a substantially constant positive potential having a value equal to the peak positive voltages which are thus impressed thereon. Thus, by way of example, assuming the peak secondary-voltage of the transformer 9 to be ±6 kv. (kilovolts), the capacitors C1 and C2 in FIG. 1, and the capacitor C1 in FIG. 3, are all unidirectionally charged to a constant 6 kilovolts, in the polarities indicated by the plus and minus signs (+) and (—), while the capacitor C2 in FIG. 3 is unidirectionally charged to 12 kilovolts, as marked.

In FIG. 1, the circuit F is grounded, the circuit E is connected to the first output-terminal T1 of the power-pack, and the circuit G is connected to the second output-terminal T2. In FIG. 3, the circuit D is grounded, the circuit H is connected to the first output-terminal T1, and the circuit L is connected to the second output-terminal T2. Thus, in both of the power-packs of FIGS. 1 and 3, the first output-terminal T1 is impressed with a constant positive voltage of 6 kv., (or the peak voltage of the transformer-secondary), while the second output-terminal T2 is impressed with a pulsating positive (or unidirectional) voltage which varies between a minimum value of +6 kv. and a maximum value of +18 kv. (or triple-voltage), during alternate half-cycles of the supply-circuit 10 of the transformer 9.

The advantage of the pulsating-voltage power-packs of FIGS. 1 and 3 is that they produce a triple-voltage output-peak, with the same component-parts as a voltage-doubling power-pack, while at the same time they never produce less than the peak voltage of the transformer-secondary at the minimum value of their pulsating output. This kind of power-pack output has a particular value in combination with my novel unbreakable-wire two-stage precipitator, as will be subsequently explained.

An exemplary form of my improved precipitator-structure is shown in FIGS. 1 and 2. The illustrated precipitator is primarily designed for domestic use, that is, to clean the air in a room or confined space which is occupied by human beings, and it will be so described, although the precipitator is also capable of cleaning industrial gases. In FIG. 1, the air to be cleaned passes downwardly through a vertical conduit or open-ended casing 13, passing first through an ionizing stage 14, where the dust-particles are charged or ionized, and then through a collector-stage 15, where the ionized particles are collected or precipitated out of the air-stream. The casing 13 is shown as being made of metal or other conducting material, which is grounded. The air-flow is maintained by a suitable blower 16 which is shown underneath the collector stage 15, blowing the air downwardly through the unit, as indicated by the arrows 17.

The improved air-cleaning unit of my present invention is characterized primarily by having an ionizing stage 14 which is equipped with one or more ionizing wires 19 having an unusually large diameter, thus overcoming the principal difficulty with previous air-cleaning precipitators wherein the fine ionizing wires were too fragile. As in the ionizing stages of previous two-stage air-cleaning units, my ionizing wire 19 is extended in a direction which is transverse to the direction of air-flow, and it is disposed in spaced relation between two large or non-ionizing electrodes 20 and 21, which must have a considerable extent in the direction of air-flow. In the embodiment shown in FIG. 1, a single ionizing wire 19 is used, and the two large electrodes 20 and 21 are the side-walls of the grounded casing 13. In my present invention, in the form shown in FIG. 1, the spacing between my unbreakable ionizing wire and each of the two large electrodes 20 and 21 must be unusually large, as will be subsequently explained.

As in the ionizing stages of previous two-stage air-cleaning units, the ionizing wire 19 (or each ionizing wire if there are more than one), must be insulatingly supported at a plurality of points, and each wire must be maintained at a suitable corona-producing potential with respect to its spaced large electrodes. Each supporting-means, for supporting the ionizing wire 19, has heretofore consisted of a short stiff supporting-wire 22, or the like, one end of which holds the ionizing wire 19, while the other end is rigidly mounted on an insulator 23. In accordance with my present invention, as shown in FIG. 1, the large size of the ionizing wire 19, and the unusually large spacing between the ionizing wire and the respective large electrodes 20 and 21, necessitate the use of properly correlated increases in the wire-voltage and in the radius of surface-curvature of the short-stiff supporting-wires 22, and also the use of a novel means for overcoming the efficiency-reducing, corona-inhibiting effects of the short stiff supporting-wires 22, as will now be explained.

In the two-stage precipitators to which my invention is related, corona is used for the purpose of charging or ionizing the dust-particles in the ionizing stage. This corona also causes ozone-generation. In domestic precipitators, the ozone-content in the cleaned air must be kept below an objectionable concentration, which is usually considered to be less than one part per one-hundred-million, thus imposing a limitation on the permissible amount or intensity of corona. Low ozone-generation requires that the corona-glow be confined to a yellowish-to-reddish cast of glow which immediately surrounds the ionizing wire 19. This means that the corona-glow must be limited to an amount which does not extend or spread out, in a so-called blue glow, into the space or region between the wire and the large electrode. At the same time, a high dust-removing efficiency must be maintained in the precipitating unit, and, to this end, enough corona must be maintained, on the ionizing wire 19, to give an adequate particle-charging rate, which is of the order of 50 to 100 microamperes per foot of wire.

These difficult-to-meet, conflicting corona-requirements, in regard to an adequate particle-charging rate and a low rate of ozone-generation, have resulted, heretofore, in a more or less standardized geometry of the ionizing zone of two-stage air-cleaning precipitators, as outlined in my above-mentioned patent, in accordance with which it has become usual to the something like a 1.25-inch spacing from the ionizing wire 19 to the large electrode 20 or 21, and the diameter of the ionizing wire 19 has been so small (usually considerably less than 10 mils), that wire-breakage, and sometimes wire-vibration, have been a difficulty. With this heretofore-standard ionizing-wire spacing, and with extremely fine ionizing wires, an ionizing-wire voltage of 12 to 14 kilovolts has, for many years, given a very high air-cleaning efficiency, with low ozone-generation, in two-stage precipitating units which have been satisfactory in every way except for the excessive fineness of the ionizing wires.

In some cases, the life of the ionizing wire has been made satisfactory (so far as wire-life is concerned), by increasing the wire-diameter to 12 or 16 mils, while using the conventional spacing between the ionizing wires and the large electrodes in the ionizing zone; but this has resulted in high ozone-generation and poorer, and rather erratic, dust-charging. If the spacing to the large electrodes is kept constant, while the wire-size is increased, it becomes necessary to increase the wire-charging voltage, in order to maintain an adequate particle-charging rate, and a point is soon reached, at which it seems almost impossible to avoid the appearance of an erratic blue glow, which causes an objectionably excessive rate of ozone-generation, as well as a dust-charging action which is less complete and less constant or steady. These operational disadvantages, coupled with the higher cost of an increased wire-charging voltage, have served to standardize the use of fine wires, in spite of their frangibility.

My present invention is predicated upon the discovery or observation that it is possible to increase the wire-size —and at the same time to avoid the blue-glow type of corona-discharge which causes objectionably excessive ozone-generation and poorer and erratic particle-charging —by suitably increasing the spacing to the large electrode; but this, in turn, necessitates a still higher wire-charging voltage, which would further increase the cost of the power-pack, except for my rewiring of the conventional double-voltage power-pack to obtain a pulsating triple-voltage output, as shown in the power-packs of FIGS. 1 and 3.

Stable corona, in which the glow is confined to a small region immediately surrounding the wire, requires a large ratio of wire-spacing to wire-diameter. While this ratio should be as high as is practicable, very good results are obtained if an interelectrode spacing of 2 inches is used, with an ionizing wire which is 12 to 16 mils in diameter. This requires an increased ionizing voltage of the order of 17 kilovolts. This increased ionizing voltage in turn produces a somewhat higher ozone-generation per unit of charging-current, but the increased ionizing-wire spacing also increases the volume of air which is charged per unit length of the ionizing wire, so that it is possible to maintain the same low ozone-concentration in the cleaned air, with electrode-proportions which avoid the blue glow.

As a result of considerations such as the foregoing, it may be said that my invention requires an ionizing wire 19 having a diameter of at least 12 mils, an ionizing-wire interelectrode spacing of at least 1.5 inch or about 120 wire-diameters, and a unidirectional potential having a value reaching at least 16 kilovolts between the wire 19 and each of the two large electrodes 20 and 21.

The use of an increased ionizing-voltage, which is necessitated by a larger wire-diameter and a larger wire-spacing, involved a further unexpected difficulty in regard to the short stiff supporting-wires 22 which support the ionizing wire 19. In domestic precipitators, positive ionization has been the invariable rule, because a positive wire-voltage produces much less ozone, for any given particle-charging rate, than a negative wire-voltage. Heretofore, when the positive potential on the ionizing wire 19 has been of the order of 12 to 13 kilovolts, an 80-mil supporting-wire 22 was strong enough mechanically, and gave no trouble. It is desirable that this supporting-wire 22 should be as small as possible, so as to limit the area in which it would inhibit ionization around the smaller ionizing wire. But when the ionizing-wire voltage was increased to 16 to 18 kilovolts, or higher, while still retaining the positive polarity, an 80-mil supporting-wire 22 produced what may be called a "flare," or abnormal corona, streaming from the supporting-wire 22 to the nearest large-electrode surface, and causing a high ozone-generation. The reason for this phenomenon is not yet clear, although it may be due to the presence of spotty insulating material on the supporting-wire 22. In order to prevent this trouble, it is necessary to use a larger supporting-wire 22, having a diameter of at least about ⅛ inch, and preferably as much as 3/16 inch, if the wire is circular. If the supporting-wire is non-circular in cross-section, it should be so shaped as to avoid edges which might produce corona, say by making it have a radius of surface-curvature of at least 60 mils, or .06 inch, at each surface-portion which is in the vicinity of the ionizing wire 19, which means, throughout the length of the supporting-wire 22, if said supporting-wire is short.

This use of a larger supporting-wire 22 introduces a further problem in the design of an efficient air-cleaning precipitator-unit, because it causes a larger inactive or non-ionizing area or region, in its vicinity, than was heretofore caused by the previously used smaller supporting-wires. Heretofore, it has been necessary to counteract the effect of these inactive or non-ionizing regions at the supporting-wires 22, either by an auxiliary means for producing ionization at the supporting-wires, as by means of points, or by baffling-means for limiting the air-flow in these regions so as to reduce the proportion of the air-flow which passes uncleaned through the unit, as shown, for example, in Patents 2,181,767 and 2,221,603. In my present invention, the higher ionizing-voltage rules out the use of points, because they would result in a blue glow and excessive ozone-generation; and the larger non-ionizing regions in the vicinity of my enlarged supporting-wires combine with my greater spacing between the ionizing wires and the large electrodes, to produce such a large inactive area as to make its shielding or baffling undesirable, as affecting too much of the cross-sectional area of the ionizing stage.

In this dilemma, I have been able to devise a wire-loop ionizing-means 24 (FIGS. 1 and 2), in which the wire loop swings far enough away from the corona-suppressing supporting-wire 22, so that corona may be obtained. Heretofore, such a loop could not be used, because a wire of the fineness heretofore used for the ionizing wire 19 would not have sufficient stiffness to stand out by itself in a loop-formation; while a wire which was significantly thicker than the flimsy ionizing wire 19 would not produce sufficient corona at a voltage which was barely adequate to produce corona on the ionizing wire 19. In my invention, however, the ionizing wire 19 has sufficient stiffness to be self-supporting when bent into a loop-formation 24, as shown in FIGS. 1 and 2. In general, my wire-loop ionizers 24, at the supporting-wires 22 at the ends of the ionizing wire 19, should have a wire-diameter of at least 12 mils, and preferably more. These wire-loops 24 should be formed so as to have no sharp-cornered wire-end, terminating in a region having a strong electrostatic field, where a point-discharge might be produced. Preferably, the wire-ends 25 of each loop 24 are inturned or bent inwardly in a cuspate indentation toward the center of the loop, as shown in FIG. 2, into a region of relatively weak electric field-strength. The loops 24 are at the same potential as the ionizing wire 19, and give a form of corona which produces ionization with a low ozone-generation, at a sufficient distance out from the corona-inhibiting supporting-wires 22, to maintain a high air-cleaning efficiency without requiring special shielding or baffling-means in the air-stream.

In the illustrative embodiment of my invention which is shown in FIG. 1, the output-terminal T2 of the power-pack is connected to the ionizing wire 19 of the precipitating unit, through a diagrammatically indicated insulated lead-in wire 26. This maintains a positive pulsating unidirectional potential, having a maximum value of +18 kilovolts, and having a minimum value of +6 kilovolts (for example), between the ionizing wire 19 and the grounded large electrodes 20 and 21. This pulsating-voltage power-source has the advantage of producing a high ionizing voltage of 18 kilovolts at substantially no greater cost than a conventional nonpulsating 12-kilovolt power-source. This gives the high peak voltage necessary to produce an adequate particle-charging corona, and yet its minimum value is sufficiently high to avoid substantial build-up of precipitated ionized particles on the ionizing wire 19 during the pulsation-times when the wire-voltage is not high enough to produce adequate charging of particles.

The use of my unidirectional pulsating-voltage ionizer-source, while fulfilling the very necessary requirement of achieving the needed high ionizing voltage at a competitive price, nevertheless has an undesirable feature because there is a period in every cycle when there is little or no ability to charge dust-particles. For the most efficient dust-removal from the air, it is necessary, therefore, to modify the ionizing stage of the unit so that, during the periods when there is an adequate voltage on the ionizing wire 19, the effective ionizing region has a depth, in the direction of air-flow, which is at least as great as the distance moved by a dust-particle borne by the air-stream in approximately one half-cycle of the pulsating unidirectional potential. In this way, during the low-voltage half cycles, and uncharged or insufficiently charged dust-particle does not get all the way through the ionizing zone before this zone becomes an effective ionizer again, and thus no particle gets through uncharged.

As shown in FIG. 1, the required depth of ionizing zone can easily be obtained by equipping the ionizing stage 14 with one or more large wires 27, or other air-pervious non-ionizing electrode-means, extending in a direction which is transverse to the direction of air-flow, at a point, in the air-flow path, which is spaced either upstream or downstream from the ionizing wire 19, by a distance corresponding to the desired depth of the ionizing region. Conventional air-velocities, in domestic precipitators, vary from 5 to 10 feet per second, in the ionizing region. With a 60-cycle power-supply in the leads 10, there is an inactive period of about one-half cycle, or 1/120 second, in the equipment shown in FIG. 1. At 10 feet per second, the air travels approximately one inch in this inactive period. The air-pervious non-ionizing electrode-means 27 in FIG. 1 must therefore be spaced from the ionizing wire 19 by a distance which is somewhat greater than one inch, which is not exhorbitant. This air-pervious non-ionizing electrode-means is electrically connected to the two large grounded electrodes 20 and 21.

After the air traverses the ionizing stage 14 in FIG. 1, it passes through the collector or dust-precipitating stage 15, which may be any suitable means for electrostatically withdrawing the charged dust-particles from the air-stream. In FIG. 1, this collector-stage 15 is diagrammatically shown as comprising a large number of closely spaced "plates" 28 and 29, with the air-stream passing through the narrow spaces between the plates. In accordance with the conventional practice, alternate plates (which are numbered 28), are grounded, as diagrammatically indicated by a conductor 30, while the remaining plates (numbered 29), are charged to a suitable potential, such as 6 kilovolts, through a diagrammatically indicated insulated lead-in wire 31, which is charged from the positive 6-kilovolt output-terminal T1 of the powerpack in FIG. 1.

In some cases, it may be desirable to eliminate the transverse air-pervious non-ionizing electrode-means 27. This can be done by adding, to the pulsating-voltage powerpack of FIG. 1 or FIG. 3, a third capacitor C3, which is charged through a third rectifier R3 from the alternating-current potential-difference between the power-pack terminals T1 and T2. This third rectifier R3 is serially connected between the pulsating high-voltage terminal T2 and a new terminal T3, which thus has a smoother, or substantially constant-potential, triple-voltage positive potential of, say, 18 kilovolts, after the manner of a voltage-tripling network, as shown in FIGS. 4 and 5, respectively. In accordance with my present invention, the voltage-tripling steady-voltage power-pack of FIG. 4 or FIG. 5 is put to a double use by using the triple-voltage terminal T3 to charge my unbreakable-wire, large-spaced ionizing zone, as indicated by the insulated lead-in wire 26′ in FIG. 4, while the single-voltage terminal T1 of the triple-voltage network is used to charge the collector-zone, as indicated by the insulated lead-in wire 31′ in FIG. 4.

My precipitating unit, as shown in FIG. 4, is, or may be, the same as in FIG. 1, except that the depth-providing transverse air-pervious non-ionizing electrode-means 27 of FIG. 1 is now omitted. The wire-loop ionizing-means 24, at the short supporting-wires 22, are preferably retained in FIG. 4, for the same reasons which were described in connection with FIG. 1.

FIGS. 6, 7 and 8 show an alternative type of precipitating unit, using a three-electrode ionizer, which has some advantages in connection with my improved, unbreakable-wire ionizer. Referring particularly to FIG. 7, it will be seen that I still use an open-ended electrically conducting casing 32 through which the air flows, and this casing is necessarily grounded, for safety-reasons, but its left and right side-walls 33 and 34 no longer constitute the large electrodes which are at a high potential-difference with respect to the ionizing wires 35, 36 and 37. There are three or more parallel ionizing wires 35, 36 and 37, disposed approximately in a plane which is transverse to the direction of air-flow, each wire having a diameter of at least 12 mils as previously described. These wires are here shown, by way of illustration, as being so long as to require an intermediate insulating supporting member, in addition to the insulating supporting members at the ends of the ionizing wires. These insulating supporting members are designated 35A, 35B, 35C; 36A, 36B, 36C; and 37A, 37B and 37C, respectively; each insulating wire-supporting member comprising a short stiff supporting-wire 22 having at least a 60-mil radius of surface-curvature as previously described, and a supporting-insulator 23.

In FIG. 7, the supporting-insulators 23 are disposed on the upstream side of the respective ionizing wires 35, 36 and 37, so as to serve as baffling-means for reducing the rate of air-flow in the vicinity of the short stiff supporting-wires 22, and the baffling-effect may be enhanced by mounting the supporting-insulators 23 under a ledge 38 which extends around all four sides of the casing 32, so as to baffle the air away from the vicinity of the side-walls where the air-cleaning efficiency is relatively poor. The centrally located insulator 36B may be carried by a plate 38B which is slightly larger, in area, than the cross-section of said insulator, and this plate may be supported by two thin cross-strips 38′ from the side-ledges 38, as shown in FIG. 6.

In FIGS. 6, 7 and 8, there are two large electrodes 39 and 40, one being disposed between each pair, 35–36, and 36–37, of the ionizing wires; but these large electrodes are insulatedly supported, as will be subsequently described. Each of these large electrodes extends, in the direction of air-flow, for a distance which is many times the diameter of the ionizing wires, and each has a spacing of at least 1.5 inches, or about 120 wire-diameters, from each of its next-adjacent ionizing wires, as previously described.

As shown in FIG. 7, I provide a special power-pack for the embodiment of my invention which is shown in FIGS. 6, 7 and 8. In FIG. 7, the component parts of the power-pack of FIG. 1 have been rearranged as follows. A first rectifier-circuit EHDE is provided, with the rectifier R1 connected between the points E and H, with the capacitor C1 connected between the points H and D, and with the point D grounded. This puts a steady positive potential of +6 kilovolts on the circuit H, which is connected to the first output-terminal T1 of the power-pack, and it makes the conductor E have an alternating potential which varies between −6 and +6 kilovolts, assuming, as before, a peak transformer-voltage of 6 kilovolts. A second rectifier-circuit EFDE is provided, with the capacitor C2 between the points E and F, and with the rectifier R2 connected between the points F and D in such polarity that the circuit F has a unidirectional pulsating negative potential which varies between −12 kilovolts and ground or zero. This circuit F is connected to the output-terminal T4 of the power-pack.

As shown in FIG. 7, the power-pack terminal T1 is connected to the three ionizing wires 35, 36 and 37, by means of a diagrammatically indicated insulated lead-in wire 41, giving these three ionizing wires 35 and 37 a small constant positive potential of +6 kilovolts with respect to the grounded left and right side-walls 33 and 34 of the casing 32. In view of this relatively small potential-difference, the two outside ionizing wires 35 and 37 may be relatively closely spaced from the respective side-walls 33 and 34, say by a distance of ¾ inch or less, so as to give some ionization in the spaces near these side-walls. In view of this relatively smaller spacing to the side-walls 33 and 34, there is not as large a proportion of the total cross-sectional area of the ionizing zone which would need to be baffled in order to compensate for the ionization-neutralizing effect of the enlarged short stiff supporting-wires 22 of the ionizing-wire supports, so that baffling such as 38 becomes more attractive, in FIG. 7, than in FIG. 1, and the wire-loop ionizers of FIG. 1 may be omitted in FIG. 7.

As further shown in FIG. 7, the pulsating negative-potential terminal T4 of the power-pack is connected to the two large insulated electrodes 39 and 40, by means of a diagrammatically indicated lead-in wire 42. This produces, in FIG. 7, the same pulsating unidirectional potential-difference between the ionizing wires and the large electrodes, as in FIG. 1, and with the same operational effect.

It will be noted that, in FIG. 7, there is a considerable potential-difference between the negatively charged large electrodes 39, 40 and the grounded casing 32, so that the ends of these large electrodes must be spaced from the front and back walls 43 and 44 of the casing 32, preferably by insulating wall-liners 45.

If, as shown, a pulsating unidirectional potential-difference, rather than a constant unidirectional potential-difference, is maintained between the ionizing wires 35, 36, 37 and the large electrodes 39, 40, in FIG. 7, then it is desirable to make provision for the same depth of ionizing zone as has been explained in connection with FIG. 1. Accordingly, in FIG. 7, I have shown an air-pervious non-ionizing electrode-means, in the form of a grid composed of three spaced large wires 46, parallel to the ionizing wires 35, 36 and 37, said large wires 46 being joined by two or more large cross-wires 47, which are also connected to the bottom edges of the two large electrodes 39 and 40, so as to be at the same electrical potential as the large electrodes, and to support the large electrodes. The grid 46—47 is supported on suitable insulators 48.

The lower part of FIG. 7, starting with the collector-stage 15, is, or may be, the same as in FIG. 1, so that no further description is needed, except perhaps to mention that the 6-kilovolt power-pack terminal T1 in FIG. 7 is also used to energize the collector-stage, in the same manner as in FIG. 1.

While I have illustrated and described several specific forms of embodiment of my invention, and while I have explained my designs with reference to several specific preferred degree-limitations, I wish it to be understood that the broader aspects of my invention are not limited to the simultaneous use of all of the specific design-details at once. And while I have explained certain advantageous significances of the various novel features of my invention, I have not by any means exhausted the recital of these advantages: for example, my larger ionizing wire 19 permits the use of larger spans between its supports, without excessive vibration; and my new ionizer-geometry makes possible the use of peak-ionizing-voltages of the order of 18 to 30 kilovolts, or possibly even higher voltages, and the use of ionizing wires 19 and loops 24 having diameters of 12 to 35 mils, or possibly even larger diameters.

I claim as my invention:

1. A two-stage gas-cleaning precipitator, comprising an ionizing stage for ionizing the particles which are to be precipitated, a collector-stage for precipitating the ionized particles, and a means for causing the gas to pass first through the ionizing stage and then through the collector-stage; said ionizing stage comprising: an ionizing wire having a diameter of at least 12 mils; insulated wire-supporting members for holding said wire extending in a direction which is transverse to the direction of gas-flow, each of said wire-supporting members having a radius of surface-curvature of at least .06 inch at each surface-portion which is in the vicinity of the ionizing wire; a plurality of wire loops having the same potential as the ionizing wire, and disposed at the respective insulated wire-supporting members, said loops having a wire-diameter of at least 12 mils; two large electrodes disposed on opposite sides of the ionizing wire, each having a spacing of at least 1.5 inches from the ionizing wire, each large electrode extending, in the direction of gas-flow, for a distance which is many times the diameter of the ionizing wire; and a supply-means for applying a unidirectional potential having a value reaching at least 16 kilovolts between the ionizing wire and the two large electrodes.

2. A two-stage gas-cleaning preciptator, comprising an ionizing stage for ionizing the particles which are to be precipitated, a collector-stage for precipitating the ionized particles, and a means for causing the gas to pass first through the ionizing stage and then through the collector-stage; said ionizing stage comprising: an ionizing wire having a diameter of at least 12 mils; insulated wire-supporting members for holding said wire extending in a direction which is transverse to the direction of gas-flow, each of said wire-supporting members having a radius of surface-curvature of at least .06 inch at each surface-portion which is in the vicinity of the ionizing wire; a plurality of wire loops having the same potential as the ionizing-wire, and disposed at the respective insulated wire-supporting members, said loops having a wire-diameter of at least 12 mils, and having their respective wire-ends inturned toward the centers of the respective loops; two large electrodes disposed on opposite sides of the ionizing wire, each having a spacing of at least 1.5 inches from the ionizing wire, each large electrode extending, in the direction of gas-flow, for a distance which is many times the diameter of the ionizing wire; and a supply-means for applying a unidirectional potential having a value reaching at least 16 kilovolts between the ionizing wire and the two large electrodes.

3. A two-stage gas-cleaning precipitator, comprising an ionizing stage for ionizing the particles which are to be precipitated, a collector-stage for precipitating the ionized particles, and a means for causing the gas to pass first through the ionizing stage and then through the collector-stage; said ionizing stage comprising: an ionizing wire having a diameter of at least 12 mils; insulated wire-supporting members for holding said wire extended in a direction which is transverse to the direction of gas-flow, each of said wire-supporting members having a radius of surface-curvature of at least .06 inch at each surface-portion which is in the vicinity of the ionizing wire; two large electrodes disposed on opposite sides of the ionizing wire, each having a spacing of at least 1.5 inches from the ionizing wire, each large electrode extending, in the direction of gas-flow, for a distance which is many times the diameter of the ionizing wire; and a single-phase supply-means, operable directly from an alternating-current industrial power-line of an ordinary frequency, for applying a unidirectional potential having a value reaching at least 16 kilovolts between the ionizing wire and the two large electrodes; said supply-means applying a pulsating unidirectional potential between said wire and said two large electrodes, said pulsating unidirectional potential cyclicly varying between a maximum value which is high enough to produce adequate charging of the particles which are to be precipitated, and a minimum value which is not high enough to produce adequate charging of particles, said minimum value being sufficiently high, however, to avoid substantial build-up of precipitated ionized particles on the wire.

4. A two-stage gas-cleaning precipitator, comprising an ionizing stage for ionizing the particles which are to be precipitated, a collector-stage for precipitating the ionized particles, and a means for causing the gas to pass first through the ionizing stage and then through the collector-stage; said ionizing stage comprising: an ionizing wire having a diameter of at least 12 mils; insulated wire-supporting members for holding said wire extended in a direction which is transverse to the direction of gas-flow, each of said wire-supporting members having a radius of surface-curvature of at least .06 inch at each surface-portion which is in the vicinity of the ionizing wire; two large electrodes disposed on opposite sides of the ionizing wire, each having a spacing of at least 1.5 inches from the ionizing wire, each large electrode extending, in the direction of gas-flow, for a distance which is many times the diameter of the ionizing wire; and a supply-means comprising a transformer, and a voltage tripling assembly of capacitors, rectifiers and circuits for providing at least two substantially constant-potential direct-current output-circuits, namely a relatively high-potential output-circuit for supplying a voltage of at least 16 kilovolts between the wire and the two large electrodes, and a relatively low-potential output-circuit for supplying a substantially smaller voltage to the collector-stage.

5. A two-stage gas-cleaning precipitator, comprising an ionizing stage for ionizing the particles which are to be precipitated, a collector-stage for precipitating the ionized particles, and a means for causing the gas to pass first through the ionizing stage and then through the collector-stage; said ionizing stage comprising: an ionizing wire, insulated wire-supporting members for holding said wire extended in a direction which is transverse to the direction of gas-flow, two large electrodes disposed in spaced relation on opposite sides of said wire, and a single-phase supply-means, operable directly from an alternating-current industrial power-line of an ordinary frequency, for applying a pulsating unidirectional potential between said wire and said two large electrodes, said pulsating unidirectional potential cyclicly varying between a maximum value which is high enough to produce adequate charging of the particles which are to be precipitated, and a minimum value which is not high enough to produce adequate charging of particles, said minimum value being sufficiently high, however, to avoid substantial build-up of precipitated ionized particles on the wire.

6. A two-stage gas-cleaning precipitator, comprising an ionizing stage for ionizing the particles which are to be precipitated, a collector-stage for precipitating the ionized particles, and a means for causing the gas to pass first through the ionizing stage and then through the collector-stage; said ionizing stage comprising: an ionizing wire, insulated wire-supporting members for holding said wire extended in a direction which is transverse to the direction of gas-flow, two large electrodes disposed in spaced relation on opposite sides of said wire, a single-phase supply-means, operable directly from an alternating-current industrial power-line of an ordinary frequency, for applying a pulsating unidirectional potential between said wire and said two large electrodes, said pulsating unidirectional potential cyclicly varying between a maximum value which is high enough to produce adequate charging of the particles which are to be precipitated, and a minimum value which is not high enough to produce adequate charging of particles, said minimum value being sufficiently high, however, to avoid substantial build-up of precipitated ionized particles on the wire, and a gas-pervious non-ionizing electrode-means extending in a direction which is transverse to the direction of gas-flow, at a point, in the gas-flow path, which is spaced, from the ionizing wire, by a distance which is sufficiently great to produce a depth of effective ionizing region which is as great as the distance moved by a particle borne by the gas-flow in approximately one half-cycle of the pulsating unidirectional potential, said non-ionizing electrode-means being electrically connected to said two large electrodes, each large electrode extending, in the direction of gas-flow, for a distance which is many times the diameter of the ionizing wire.

7. A two-stage gas-cleaning precipitator, comprising an ionizing stage for ionizing the particles which are to be precipitated, a collector-stage for precipitating the ionized particles, and a means for causing the gas to pass first through the ionizing stage and then through the collector-stage; said ionizing stage comprising: an ionizing wire, insulated wire-supporting members for holding said wire extended in a direction which is transverse to the direction of gas-flow, two large electrodes disposed in spaced relation on opposite sides of said wire, and a supply-means for applying a pulsating unidirectional potential between said wire and said two large electrodes, said pulsating unidirectional potential cyclicly varying between a maximum value which is high enough to produce adequate charging of the particles which are to be precipitated, and a minimum value which is not high enough to produce adequate charging of particles, said minimum value being sufficiently high, however, to avoid substantial build-up of precipitated ionized particles on the wire, said supply-means comprising a transformer having one or more alternating-current transformer-winding-portions, a first capacitor, a second capacitor, a first rectifier, a second rectifier, a first rectifier-circuit including said first capacitor, said first rectifier, and a transformer-winding-portion, a second rectifier-circuit including said second capacitor, said second rectifier, and a transformer-winding-portion, and an output-circuit including said second capacitor, a transformer-winding-portion, and said first capacitor.

8. A two-stage gas-cleaning precipitator, comprising an ionizing stage for ionizing the particles which are to be precipitated, a collector-stage for precipitating the ionized particles, and a means for causing the gas to pass first through the ionizing stage and then through the collector-stage; said ionizing stage comprising: an ionizing wire, insulated wire-supporting members for holding said wire extended in a direction which is transverse to the direction of gas-flow, two large electrodes disposed in spaced relation on opposite sides of said wire, and a supply-means for applying a pulsating unidirectional potential between said wire and said two large electrodes, said pulsating unidirectional potential cyclicly varying between a maximum value which is high enough to produce adequate charging of the particles which are to be precipitated, and a minimum value which is not high enough to produce adequate charging of particles, said minimum value being sufficiently high, however, to avoid substantial build-up of precipitated ionized particles on the wire, said supply-means comprising a transformer having one or more alternating-current transformer-winding-portions, a first capacitor, a second capacitor, a first rectifier, a second rectifier, a first rectifier-circuit including said first capacitor, said first rectifier, and a transformer-winding-portion, a second rectifier-circuit including said second capacitor, said second rectifier, and said first capacitor, and a transformer-winding-portion, and an output-circuit including said second capacitor and a transformer-winding-portion.

9. A two-stage gas-cleaning precipitator, comprising an ionizing stage for ionizing the particles which are to be precipitated, a collector-stage for precipitating the ionized particles, and a means for causing the gas to pass first through the ionizing stage and then through the collector-stage; said ionizing stage comprising: an ionizing wire, insulated wire-supporting members for holding said wire extended in a direction which is transverse to the direction of gas-flow, two large electrodes disposed in spaced relation on opposite sides of said wire, and a supply-means for applying a pulsating unidirectional potential between said wire and said two large electrodes, said supply-means comprising a transformer having one or more alternating-current transformer-winding-portions, a first capacitor, a second capacitor, a first rectifier, a second rectifier, a first rectifier-circuit including said first capacitor, said first rectifier, and a transformer-winding-portion, a second rectifier-circuit including said second capacitor, said second rectifier, and a transformer-winding-portion, and an output-circuit including said second capacitor, a transformer-winding-portion, and said first capacitor.

10. A two-stage gas-cleaning precipitator, comprising an ionizing stage for ionizing the particles which are to be precipitated, a collector-stage for precipitating the ionized particles, and a means for causing the gas to pass first through the ionizing stage and then through the collector-stage; said ionizing stage comprising: an ionizing wire, insulated wire-supporting members for holding said wire extended in a direction which is transverse to the direction of gas-flow, two large electrodes disposed in spaced relation on opposite sides of said wire, and a supply-means for applying a pulsating unidirectional potential between said wire and said two large electrodes, said supply-means comprising a transformer having one or more alternating-current transformer-winding-portions, a first capacitor, a second capacitor, a first rectifier, a second rectifier, a first rectifier-circuit including said first capacitor, said first rectifier, and a transformer-winding portion, a second rectifier-circuit including said second capacitor, said second rectifier, said first capacitor, and a transformer-winding-portion, and an output-circuit including said second capacitor and a transformer-winding portion.

11. A pulsating unidirectional-potential supply-means comprising a transformer having one or more alternating-current transformer-winding-portions, a first capacitor, a second capacitor, a first rectifier, a second rectifier, a first rectifier-circuit including said first capacitor, said first rectifier, and a transformer-winding-portion, a second rectifier-circuit including said second capacitor, said second rectifier, and a transformer-winding-portion, and an output-circuit including said second capacitor, a transformer-winding portion, and said first capacitor.

12. A pulsating unidirectional-potential supply-means comprising a transformer having one or more alternating-current transformer-winding-portions, a first capacitor, a second capacitor, a first rectifier, a second rectifier, a first rectifier-circuit including said first capacitor, said first rectifier, and a transformer-winding-portion, a second rectifier-circuit including said second capacitor, said second rectifier, said first capacitor, and a transformer-winding portion, and an output-circuit including said second capacitor and a transformer-winding-portion.

13. A two-stage gas-cleaning precipitator, comprising an ionizing stage for ionizing the particles which are to be precipitated, a collector-stage for precipitating the ionized particles, and a means for causing the gas to pass first through the ionizing stage and then through the collector-stage; said ionizing stage comprising: a grounded, electrically conducting casing through which the gas flows; a plurality of parallel ionizing wires disposed approximately in a plane which is transverse to the direction of gas-flow, each wire having a diameter of at least 12 mils; insulated wire-supporting members for each wire, each of said wire-supporting members having a radius of surface-curvature of at least .06 inch at each surface-portion which is in the vicinity of the ionizing wire; a large insulated electrode disposed between each pair of ionizing wires, each large insulated electrode having a spacing of at least 1.5 inches from each wire of its pair, each large electrode extending, in the direction of gas-flow, for a distance which is many times the diameter of the ionizing wire; each of the two end-wires, which are adjacent to the casing, being substantially closer to the casing than to the adjacent large insulated electrode; and an electrical supply-means for applying a substantially constant unidirectional positive potential of a relatively moderate value to each ionizing wire, and for applying a unidirectional negative potential to each large insulated electrode, the values of said potentials being such that the potential between the wires and the large insulated electrode or electrodes has a maximum value of at least 16 kilovolts.

14. A two-stage gas-cleaning precipitator, comprising an ionizing stage for ionizing the particles which are to be precipitated, a collector-stage for precipitating the ionized particles, and a means for causing the gas to pass first through the ionizing stage and then through the collector-stage; said ionizing stage comprising: a grounded, electrically conducting casing through which the gas flows; a plurality of parallel ionizing wires disposed approximately in a plane which is transverse to the direction of gas-flow, each wire having a diameter of at least 12 mils; insulated wire-supporting members for each wire, each of said wire-supporting members having a radius of surface-curvature of at least .06 inch at each surface-portion which is in the vicinity of the ionizing wire; a large insulated electrode disposed between each pair of ionizing wires, each large insulated electrode having a spacing of at least 1.5 inches from each wire of its pair, each large electrode extending, in the direction of gas-flow, for a distance which is many times the diameter of the ionizing wire; each of the two end-wires, which are adjacent to the casing, being substantially closer to the casing than to the adjacent large insulated electrode; an electrical supply-means for applying a substantially constant unidirectional positive potential of a relatively moderate value to each ionizing wire, and for applying a unidirectional negative potential of a relatively larger maximum value to each large insulated electrode, the values of said potentials being such that the potential between the wires and the large insulated electrode or electrodes has a maximum value of at least 16 kilovolts; and baffling-means for reducing the rate of gas-flow in the vicinity of the wire-supporting members.

References Cited in the file of this patent

UNITED STATES PATENTS

| | | |
|---|---|---|
| 2,101,168 | Deutsch | Dec. 7, 1937 |
| 2,200,085 | Hildebrand | May 7, 1940 |
| 2,213,199 | Bouwers | Sept. 3, 1940 |
| 2,235,081 | Nielsen | Mar. 18, 1941 |
| 2,427,740 | Pegg | Sept. 23, 1947 |
| 2,443,780 | Wintermute | June 22, 1948 |
| 2,798,572 | Fields | July 9, 1957 |
| 2,856,575 | Charbonnier | Oct. 4, 1958 |

FOREIGN PATENTS

| | | |
|---|---|---|
| 691,341 | Great Britain | May 13, 1953 |